United States Patent [19]
Delageniere et al.

[11] Patent Number: 5,406,478
[45] Date of Patent: Apr. 11, 1995

[54] METHOD FOR RECONSTRUCTING THREE-DIMENSIONAL IMAGES OF A CHANGING OBJECT

[75] Inventors: Solange Delageniere, Grenoble; Pierre Grangeat, Saint Ismier, both of France

[73] Assignee: Commissariat A L'Energie Atomique, France

[21] Appl. No.: 185,472

[22] Filed: Jan. 24, 1994

[30] Foreign Application Priority Data

Jan. 29, 1993 [FR] France .................. 93 00946

[51] Int. Cl.$^6$ .......................................... G06F 15/42
[52] U.S. Cl. ................................................ 364/413.19
[58] Field of Search ................... 364/413.13, 413.17, 364/413.15, 413.14, 413.16, 413.23

[56] References Cited

U.S. PATENT DOCUMENTS

| | | | |
|---|---|---|---|
| 4,212,062 | 7/1980 | Kohno et al. | 364/414 |
| 5,073,858 | 12/1991 | Mills | 364/413.13 |
| 5,359,513 | 10/1994 | Kano et al. | 364/413.13 |

OTHER PUBLICATIONS

Prasad et al, "Three-Dimensional Image Restoration Using Constrained Optimization Techniques", Optical Engineering, vol. 29, No. 4, Apr. 1990, pp. 279–288.
Medoff et al, "The Use of a Priori Information in Image Reconstruction from limited Data", Apr. 1983 ICASSP83 pp. 131–134.
Kudo et al, "Reconstruction of Magnetic Resonance Images by Iterative Methods", Systems and Computers in Japan, vol. 23, No. 3, 1992, pp. 62–74.

*Primary Examiner*—Donald E. McElheny, Jr.
*Attorney, Agent, or Firm*—Hayes, Soloway, Hennessey, Grossman & Hage

[57] ABSTRACT

The present invention provides a method for generating three-dimensional images of an object having a network of points. One preferred embodiment of the present invention comprises using a moving two-dimensional sensor network array to take measurements, at successive discrete time intervals, of radiation emanating from the network of points. The sensors generate electrical signals representative of the object at the discrete time intervals, which impulses are used to generate a system of linear equations describing the object at these discrete time intervals. A change function function is generated to describe the object in between the discrete time intervals. Finally, electrical signals representative of a continuous description of the object are generated using the system of equations and the change function, which continuous description are used to generate three-dimensional images of the object.

4 Claims, 1 Drawing Sheet

METHOD FOR RECONSTRUCTING THREE-DIMENSIONAL IMAGES OF A CHANGING OBJECT

FIELD OF THE INVENTION

The invention concerns a method for reconstructing three-dimensional images of a changing object whose appearance changes over a period of time or which moves.

BACKGROUND OF THE INVENTION

Conventional methods consist of taking a certain number of views of the object by a two-dimensional network of sensors which is successively installed with diverse orientations around the object. The sensors measure the sums or projections of a function or property to be measured on lines traversing the object. The lines may be rays emitted by a source whose total attenuation is measured through the object, or a composite ray produced by the overall transmission activity of the points of the object situated on the focussing lines of each sensor. These two situations scarcely differ as regards the reconstructing and calculation principles as everything occurs in one second if the ray were emitted from a visual source. The combination of the attenuation and emission sums makes it possible to refine the value taken by the corresponding property of the object at each point of a rendering discrete network.

In order to reconstruct the image, it is possible to use analytic methods in which the measurements undergo an analytic transformation, such as a Fourier or Radon transformation, followed by a formula for inverting the transform of the measurements applied before obtaining the values of the property to the points of the network for rendering discrete drawbacks due to the number of calculations may be significantly attenuated if an item of information or the information a priori concerning the object is/are introduced. In fact, there is frequently a pre-established fairly accurate notion of the distribution of the property (in terms of density, shape or texture, etc) measured at least in one portion of the object, and the introduction of the corresponding description as an initial iteration stage or definitive result for certain zones of the object further improves the result and may accelerate convergence.

However, the invention concerns reconstructions conducted on changing objects, other problems then appearing as the successive measurements are obtained for different states of the object, which renders the reconstructions blurred, whether the reconstruction method is algebraic or analytical.

Several solutions have been put forward for resolve this drawback. For example, it is possible to take all the measurements at the same time, which requires that the device is equipped with the corresponding number of detecting networks so as to obtain extremely clear images, the resolution of the system being in this instance complete. This solution is less realistic as being too expensive and difficult to implement. Another solution used consists of taking solely one portion of the measurements simultaneously, which does not make it possible to obtain extremely clear images, the resolution of the system not being complete. For cyclic phenomena, such as physiological phenomena (cardiac optical image formation), it has been proposed to only take the measurements at the same point of each cycle, but all the changing phenomena of the object to be reconstructed are clearly not cyclic: this is the case with measurements where the ray is measured emitted by a radioactive tracer injected into the organism and which dilutes rapidly. There are even situations where the measurements differ significantly for cyclic phenomena. Finally, synchronized measurements on each cycle last overall for a long period and only make it possible to reconstruct images of the object in the measuring phase.

SUMMARY OF THE INVENTION

In short, the invention consists of taking measurements successively at relatively rapid intervals without being concerned of being in synchronism with a subsequent cycle and of correcting the measurements by means of a correction application which expresses the assumed change of the phenomenon. In the most current envisaged embodiment, a uniform progression is attributed to the phenomenon, which significantly simplifies the frequently complicated matrix calculations which need to be used.

The method for reconstructing three-dimensional images of an object defined by values taken by a property in a network of points of the object consists of periodically adding measurements of sums of the property on lines projected onto the sensors of a two-dimensional network, the network of sensors being orientated differently around the object on each measurement and the values of the property changing over a period of time, and of then resolving a system of linear equations expressing the measured sums of the property according to the values of the property on the points and weighting coefficients, wherein it also consists of expressing the changes at each point of the network of points between the successive measurements by a changing function (which makes it possible to link the object at a given moment to the same object at one or several other moments), and of resolving the system of equations by using the changing function so as to express the sums measured according to the values of the property on the points taken solely for certain moments.

BRIEF DESCRIPTION OF THE DRAWINGS

There now follows a more detailed description of the invention with the aid of the accompanying figures given by way of non-restrictive illustration.

DETAILED DESCRIPTION OF THE PREFERRED EMBODIMENTS

Figure 1:
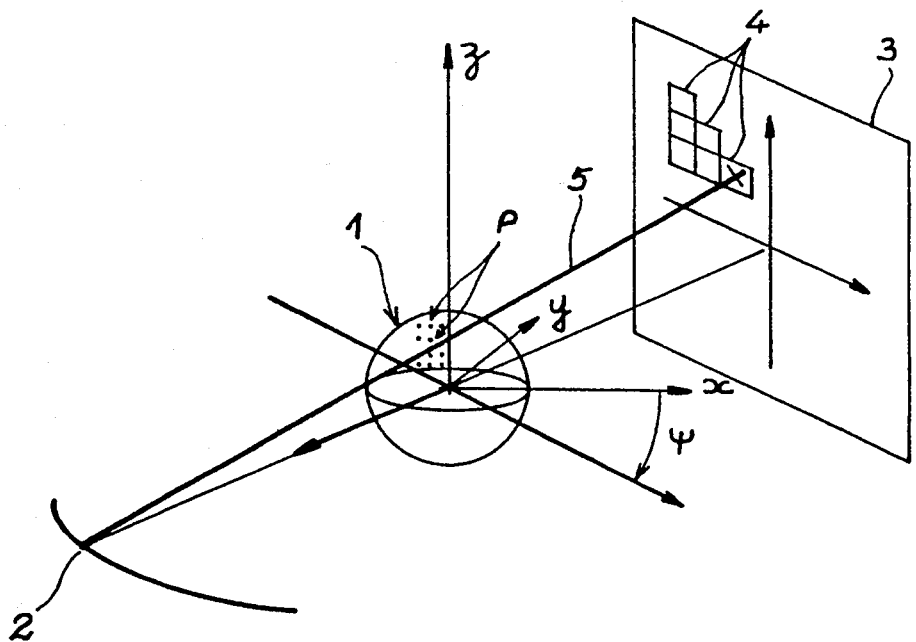
FIG. 1 is a diagrammatic view of the material elements of the invention.

The object 1 whose image is to be reconstructed is shown in the form of a ball on FIG. 1, but it may be of any shape. It is placed between a source 2 and a two-dimensional network 3 of sensors 4 which are disposed on a plane and focussed towards the source 2, the rays 5 which correspond to the focussing lines, able to be, as seen earlier, actually emitted by the source 2 towards the sensors 4 or converge towards an artificial source 2 depending on whether the property measured is the attenuation of a ray through the object or the emission of a ray by the object. The object 1 is rendered discrete at a certain number of points P which may be disposed in such a way as to form a cubic meshing defined by cartesian coordinates X, Y and Z regularly distributed on a mark constituted by axes x, y and z perpendicular and concurrent to the center of the object 1.

The measurements most simply consist of moving the source 2 and the network 3 of sensors on circular paths around the object 1 by taking several two-dimensional images of the object 1 defined by an angle a of rotation of the source 2 and the network 3 opposite it inside a common plane defined by the axes x and y. In the same way, the object 1 may be placed on a rotating support and the source 2 and the network 3 of sensors 4 are then immobilized. Paths having more complicated forms with three dimensions are also possible. In all these cases, the system of linear equations to be resolved is summed up by the formula (1):

$$m = H.f + b$$

where m is a column matrix of the measurements, f a column matrix of the sought-after property on the points of the object 1, H the passage matrix which groups together the weighting coefficients and b represents the noise of measurements which may subsequently not be considered in the calculations. If there are NPSI measurements, NP and NQ lines and columns of sensors 4, NX, NY and NZ lines arranged and columns of points P along the three directions, the dimension of f is NX.NY.NZ and the dimension of m is NP.NQ.NPSI. If the object 1 is changing, the situation is however more complicated as the matrix f is modified on each measurement and thus one arrives as far as NX.NY.NZ.NPSI unknown for NP.NQ.NPSI equations, which shows that the system is clearly underdetermined if, for example, NX, NY, NZ, NP and NQ are of the same order of magnitude, which is often verified.

Thus, it is decided to describe a pre-established time-evolution of the object, either, for example, by the equation (2):

$$f(t) = A.f(t-1) + B.f(t+1) \quad (2)$$

where A and B are two description matrixes of the evolution and $f(t-1)$, $f(t)$ and $f(t+1)$ denote the values (grouped into column matrixes) of the property on the points P of the object 1 during three consecutive measurements.

The equation (3) here may be deduced from the equation (2) and may be noted in accordance with the equation (4) in a matrix form. The equation (5) is then deduced via the recurrence of the equation (4), which is still written according to the initial state of the object 1 and its final state according to the equation (6).

$$\begin{bmatrix} f(t) \\ f(t+1) \end{bmatrix} = \begin{bmatrix} O & I \\ [-B^{-1} \cdot A] & B^{-1} \end{bmatrix} \cdot \begin{bmatrix} f(t-1) \\ f(t) \end{bmatrix} \quad (4)$$

$$\begin{bmatrix} f(t) \\ f(t+1) \end{bmatrix} = R(t-1) \cdot \begin{bmatrix} f(1) \\ f(2) \end{bmatrix} \text{ where } R(t-1) =$$

$$\begin{bmatrix} \alpha(t) & \beta(t) \\ \alpha(t+1) & \beta(t+1) \end{bmatrix}$$

$$f(t) = A'(t) \cdot f(1) + B\Delta(t) \cdot f(NPSI) \quad (6)$$

and $$B'(t) = \beta(t) \cdot \beta(NPSI)^{-1}.$$

where $A'(t) = \alpha(t) - \beta(t).\beta(NPSI) \cdot \alpha(NPSI)$ and $B'(t) := \beta(t).\beta(NPSI)^{-1}$.

The generalization at all the stages for taking measurements is summed up by the equation (7) and the calculation of the matrixes A' and B' or $\alpha$ and $\beta$ is obtained easily by diagonalizing the matrix R and by then calculating its powers.

$$\begin{bmatrix} f(1) \\ f(2) \\ \cdot \\ \cdot \\ \cdot \\ f(NPSI) \end{bmatrix} = \begin{bmatrix} A'(1) & B'(1) \\ A'(2) & B'(2) \\ \cdot & \cdot \\ \cdot & \cdot \\ \cdot & \cdot \\ A'(NPSI) & B'(NPSI) \end{bmatrix} \cdot \begin{bmatrix} f(1) \\ f(NPSI) \end{bmatrix} \quad (7)$$

The problem of reconstruction is then expressed by the equation (8) which is a linear system of 2 NVOX unknown, namely, f(1) and f(NPSI) (NVOX denoting the number of pixels or points P of the object (1) for NP.NQ.NPSI equations:

$$\begin{bmatrix} m(1) \\ m(2) \\ \cdot \\ \cdot \\ \cdot \\ m(NPSI) \end{bmatrix} = \begin{bmatrix} H(1) & 0 & & & \\ O & H(2) & 0 & & \\ \cdot & \cdot & \cdot & \cdot & \\ \cdot & \cdot & \cdot & \cdot & \\ \cdot & \cdot & \cdot & \cdot & \\ 0 & \cdot & \cdot & 0 & H(NPSI) \end{bmatrix} \cdot$$

$$\begin{bmatrix} A'(1) & B'(1) \\ A'(2) & B'(2) \\ \cdot & \cdot \\ \cdot & \cdot \\ \cdot & \cdot \\ A'(NPSI) & B'(NPSI) \end{bmatrix} \cdot \begin{bmatrix} f(1) \\ f(NPSI) \end{bmatrix} + [b] \quad (8)$$

For example, the equation (8) is resolved iteratively by using an algebraic method and by adapting a SART (Simultaneous Algebraic Reconstruction Technics) type algorithm.

It ought to be mentioned that the matrices H denote the known coefficients which express approximate geometrical relations the contribution between points P of the object 1 to the rays 5 for the various measurements.

Figure 2:
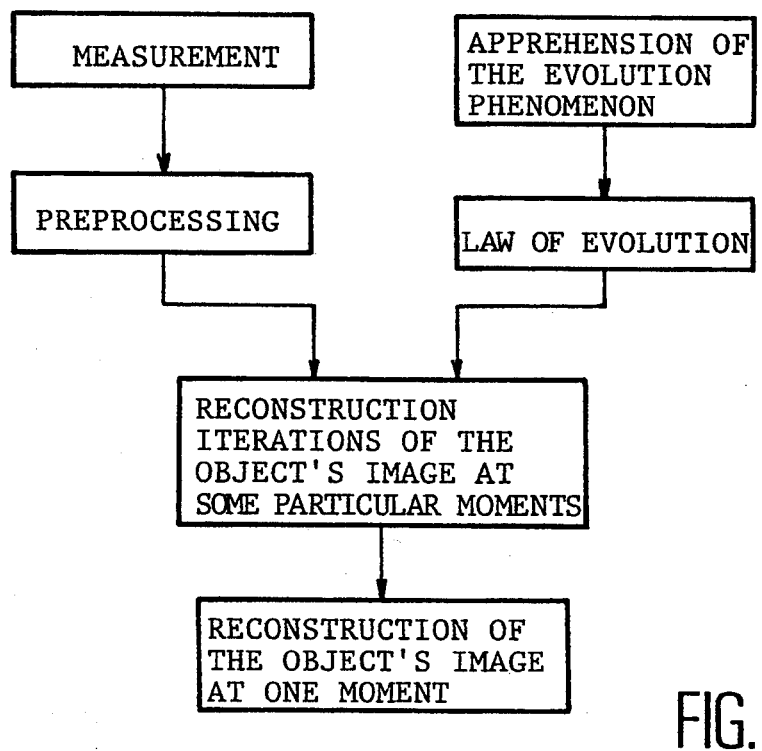
FIG. 2 is summary diagram.

FIG. 2 illustrates the method. The preprocessings denote the conversions to move from the rough results of the measurements of the sensors to the physical characteristics of the object 1 (for example, the logarithmic conversion which makes the intensity of the radiation detected pass to the attentuation coefficients). Good results have been found in practice with a blur less than with normal methods where the object is assumed immovable. The method of the invention is able to calculate the state of the object 1 for any particular moment by using the equation (7). The matrices A and B mainly comprise few coefficients so that the calculations are rapid. The law of evolution of course depends on the phenomenon encountered : this may be a purely temporal evolution of the points of the object without there being any influence between one point its neighbouring points, which is true when a non-ductile object moves during acquisition. The matrices A and B are then purely diagonal. If spatial diffusion phenomena exist, such as the dilation or compression of devices or more generally movements of one portion of the object inside the latter, the matrices A and B are more filled but their coefficients normally remain less numerous and grouped on several diagonals.

The evolution phenomenon may frequently be regarded as moving at a constant speed. If it is purely temporal and uniform, it may be demonstrated that $A = B = \frac{1}{2}$ in this extremely simple case.

Furthermore, it often happens that the changes only concern certain points of the object, the rest of the object remaining not moving, which further reduces the calculations.

A generalization of the equation (2) mentioned above may be put forward. It consists of providing the evolution function in the form of the contribution of a series of prior and subsequent states, namely:

$$f(t) = \sum_{n=1}^{NA} An\, f(t-n) + \sum_{n=1}^{NB} Bn\, f(t+n) \quad (9)$$

where the prior NA and subsequent NB states are used with the aid of the matrices An and Bn which represent their contribution. If NA=NB=N is supposed, the equation (7) may be generalized like this:

$$\begin{bmatrix} f(1) \\ \cdot \\ \cdot \\ \cdot \\ f(NPSI) \end{bmatrix} = \begin{bmatrix} C(1) & & CN(1) \\ \cdot & & \cdot \\ \cdot & & \cdot \\ \cdot & & \cdot \\ C1(NPSI) & & CN(NPSI) \end{bmatrix} \cdot \begin{bmatrix} f(i1) \\ \cdot \\ \cdot \\ \cdot \\ B(iN) \end{bmatrix} \quad (10)$$

where Cj(i) is the contribution of the image i to the image j and f(i) is the image at a moment i so that $1 \leq i \leq (NSPI)$.

In a propagation movement of a product with molecular contrast, the moments of the start and end of the process shall preferably be selected to represent the phenomenon. In a respiratory movement, the inspiration, expiration and preferably several intermediate states, such as two, shall be taken into account owing to the complex movements characteristic of this organic function.

The invention could be used in normal applications for optical image formation, namely in medical applications, and non-destructive industrial controls. The radiation shall frequently be formed of X-rays. As has already been seen, the evolution of the object may include, not merely a movement but also a change of shape or volume or a propagatory or transient state and, possibly with the time involved, may be uniform.

What is claimed is:

1. A method for generating three-dimensional images of an object having a network of points defining said object according to values assumed by a property of said points, said method comprising the steps of:
   a. measuring radiation projecting from said object onto a two-dimensional sensor array;
   b. generating, from measurement of said radiation, electrical signals representative of a certain value assumed by said property of said network of points;
   c. during a plurality of successive discrete time intervals, moving said two-dimensional sensor array relative to said object and repeating steps a and b to obtain a plurality of electrical signals respectively representative of a plurality of certain values assumed by said property of said network of points at said successive time intervals, each of said plurality of certain values defining said object at each said plurality of time intervals;
   d. generating a system of linear matrix equations based upon said plurality of values and a plurality of weighting coefficients, said system of linear equations describing said object at said discrete time intervals;
   e. generating a change function for said plurality of values, said change function describing said object between said discrete time intervals; and
   f. using said change function, said system of linear equations, and said weighting coefficients to generate electrical signals representative of a continuous description of said object for use in generating three-dimensional images of said object.

2. A method according to claim 1, wherein the system of equations is resolved by iterations.

3. A method according to claim 1, wherein said change function is described by invariable matrices expressing present values of said property in terms of future and past values of said property.

4. A method according to claim 3, wherein the system of equations is resolved by iterations.

* * * * *